US006420029B1

(12) United States Patent
Tavernier et al.

(10) Patent No.: US 6,420,029 B1
(45) Date of Patent: Jul. 16, 2002

(54) HYBRID CARRIER COATING CONTAINING A SILANE NETWORK AND A POLYMERIC COMPOUND NOT CONTAINING SILICON ATOMS

(75) Inventors: Serge Tavernier, Lint; Daniel Heitzmann, Mortsel, both of (BE)

(73) Assignee: Xeikon International, Mortsel (BE)

( * ) Notice: Subject to any disclaimer, the term of this patent is extended or adjusted under 35 U.S.C. 154(b) by 0 days.

(21) Appl. No.: 09/444,496

(22) Filed: Nov. 22, 1999

(30) Foreign Application Priority Data

Nov. 26, 1998 (EP) .......................................... 98204006

(51) Int. Cl.[7] .............................................. B32B 5/16
(52) U.S. Cl. .................................................. 428/407
(58) Field of Search ................................ 428/403, 407

(56) References Cited

U.S. PATENT DOCUMENTS

| | | | | | |
|---|---|---|---|---|---|
| 3,833,366 | A | | 9/1974 | Madrid et al. | |
| 4,977,054 | A | * | 12/1990 | Honjo et al. | 430/108 |
| 5,068,301 | A | | 11/1991 | Okamura et al. | |
| 5,288,578 | A | * | 2/1994 | Sugizaki et al. | 430/108 |
| 5,368,969 | A | * | 11/1994 | Yoshikawa et al. | 430/108 |
| 5,514,509 | A | * | 5/1996 | Kawata et al. | 430/108 |
| 5,885,741 | A | * | 3/1999 | Akamastu et al. | 430/106.6 |
| 5,989,767 | A | * | 11/1999 | Yoerger et al. | 430/106.6 |
| 6,083,652 | A | * | 7/2000 | Duggan et al. | 430/106.6 |
| 6,132,917 | A | * | 10/2000 | Hoffend et al. | 430/106.6 |

FOREIGN PATENT DOCUMENTS

| | | |
|---|---|---|
| EP | 0 898 206 A2 | 2/1999 |
| WO | WO 98/53372 | 11/1998 |

OTHER PUBLICATIONS

Derwent Publications Ltd., Section Ch, Week 9833, London, GB; Class A05, AN 98–382487; XP002102258 & JP 10 153886 A (Matsushita), Jun. 9, 1998, Abstract.

* cited by examiner

*Primary Examiner*—Hoa T. Le
(74) *Attorney, Agent, or Firm*—Knobbe, Martens, Olson and Bear LLP

(57) ABSTRACT

Carrier particles having a coating comprising a polycondensation network containing a chemical compound selected from the group consisting of a monomeric polyfunctional organosilane, an hydrolysis product of a monomeric polyfunctional organosilane, a reaction product of a monomeric polyfunctional organosilane with an organosilane containing an hetero-atom and a reaction product of a monomeric polyfunctional organosilane with an alkoxide, characterized in that the coating further comprises between 5% and 50%, by weight, both limits included, of a polymeric compound not containing silicon atoms.

6 Claims, No Drawings

HYBRID CARRIER COATING CONTAINING A SILANE NETWORK AND A POLYMERIC COMPOUND NOT CONTAINING SILICON ATOMS

FIELD OF THE INVENTION

This invention relates to coated particles. It relates especially to coated carrier particles to be used as carrier particles in multi-component developers for electrostatic imaging with magnetic brush development as well in cascade development.

BACKGROUND OF THE INVENTION

In electrostatographic imaging, carrier particles, mostly magnetic carrier particles, are mixed with toner particles (and with other ingredients) to form a developer. When the developer is to be used in magnetic brush development, the carrier particles are magnetic, and when the developer is used in cascade development, the carrier particles can be coated glass beads. In any case, the rubbing of the carrier particles and the toner particles induce a tribo-electric charge in the toner particles and the nature of the coating on the carrier particles determines, together with the toner ingredients, not only the polarity of the charge on the toner articles and the amount of the charge but also the stability of the charge over time, the charge distribution over the population of toner particles, etc. Thus the coating of the carrier particles is very crucial to the resulting properties of the developer and thus to the image quality that can be reached with that developer. Also the speed of charging of the toner particles is to a large extent determined by the coating of the carrier particles. Carrier particles having a high speed of charging towards the toner particles are beneficial, especially when images with high image fill (i.e. a high amount of area in an page is really occupied by toning particles) are present. Then, large amounts of toner are consumed and the toner, especially in long run printing, resides only a limited time in the developer. In such a situation, the toner has only a limited number of activation cycles. Hence, the charging properties of the developer, in terms of its kinetics, i.e. the speed of the rise of the charge amount, as well as in terms of its plateau value, are important.

In JP-A-10 153 886 it is disclosed to apply on carrier particles for use in electrostatographic developers a coating of a polyester with relatively high acid value and trialkyloxysilane compounds that contain groups that can react with the free acid groups of the polyester.

In WO-A 98/53372 a new type of coating has been described, consisting of chemical compounds selected from the group consisting of a monomeric polyfunctional organosilane, a hydrolysis product of a monomeric polyfunctional organosilane, a reaction product of a monomeric polyfunctional organosilane with an organosilane containing a hetero-atom and a reaction product of a monomeric, polyfunctional organosilane with an alkoxide. Such a coating offers interesting properties, as described in said application. Moreover in EP-A 898 206 it has been disclosed that such a coating could be applied to carrier particles in a simple method that requires only mechanical stirring and uses a low amount of solvent.

The coating disclosed in WO-A 98/53372 produced with the method described in EP-A 898 206 has a very long lifetime and can easily be manufactured in an inexpensive method. However, it is shown that the coating shows some limitations in terms of activation behaviour, i.e. the charging of the toner particles in rubbing contact with the carrier coating shows relatively low speed and thus when images with high page fill have to be printed, some problems with charging can occur.

There is thus a further need for improvement in the activation property for such coatings. Moreover it has been found that this tendency is quite general. Silicon-atom containing coatings seem to have a lower activation property, and so it is described in the literature to add charging agents to such coatings. At the same time it is observed that the incorporation of these charging agents gives some instabilities to the manufacturing method described previously. In particular, coagulation and/or agglomeration occurs to some extent, thus giving rise to composition differences in the coating and hence differences in properties of the coated particles.

There is thus still a need to improve the performance of coated particles in general and carrier particles.

OBJECTS AND SUMMARY OF THE INVENTION

It is an object of the invention to provide a coating composition whereby the coating can be designed in a flexible way to incorporate new properties and performances in this coating especially with respect to the speed of charging.

It is a further object of the invention to provide a coating composition whereby said coating can be applied in an easy, inexpensive and controllable way, resulting in a thin homogeneous layer without interruptions on the surface of the particles.

It is a further object of the invention to provide a coating composition whereby said coating can be applied in such a way that the composition of said coating on different particles of said coated particles population is similar to a high extent, inducing similar properties all over the coated particles and that during coating no or very few agglomerates are formed.

Further objects and advantages of the invention will become clear from the detailed description hereinafter.

The objects of the invention are realised by providing carrier particles having a coating comprising a polycondensation network having moieties derived from chemical compounds selected from the group consisting of a monomeric polyfunctional organosilane, an organosilane containing a hetero-atom and an alkoxide, characterised in that said coating further comprises an amount A of a polymeric compound not containing silicon atoms so that $5\% \leqq A \leqq 50\%$ by weight, with respect to the weight of the dried coating.

DETAILED DESCRIPTION OF THE INVENTION

The quality of a coating for carrier particles according to the chemistry disclosed in WO-A 98/53372, that is included herein by reference, could surprisingly be enhanced with respect to the activation, i.e. the speed of charge accumulation on toner particles by rubbing contact between the carrier and the toner particles, when appreciable amounts of a non silicon containing polymeric substance were included in the coating. It was found that between 5 and 50 by weight, both limits included, of such non silicon containing polymeric compounds could be incorporated in the coating. Preferably an amount between 10 and 30% by weight, both limits included, is incorporated. Very surprisingly it was shown possible to incorporate such amounts of non silicon containing polymeric compounds in the coating using the method that was disclosed in EP-A 898 206 without problems of agglomeration and in a very reproducible way, although when said method was used for coating the particles with the same non silicon containing compound alone severe agglomeration occurred. It seems, without being bound to any theory, that the non silicon containing polymeric compound is essentially trapped in the polycondensation network forming a complex or an interpenetrating network.

Thus carrier particles according to this invention comprise a coating comprising a polycondensation network having moieties derived from chemical compounds selected from the group consisting of a monomeric polyfunctional organosilane, an organosilane containing an hetero-atom and an alkoxide, characterised in that said coating further comprises an amount A of a polymeric compound not containing silicon atoms so that $5\% \leqq A \leqq 50\%$ by weight, with respect to the weight of the dried coating.

In a preferred embodiment, said polycondensation network is derived from 20 to 80% by weight of polyfunctional organosilane, 20 to 80% by weight of alkoxide, and 0 to 10% by weight of organosilane (I) which contains a hetero atom. In a more preferred embodiment, said polycondensation network contains 19.9 to 80% by weight of polyfunctional organosilane, 19.9 to 80% by weight of alkoxide (II), and 0.1 to 10% by weight of organosilane (I) which contains a hetero atom.

The polycondensation network can in addition to the chemicals above contain finely divided metal oxides or metal oxide-hydroxides of the elements Si, Sn, In, Tl, Zr, B or Al, e.g. silica sols, which contain organic solvents in particular. The preferred primary particle size thereof falls within the range from 1 to 50 nm; they are hereinafter termed “nanoparticles”.

When nano-particles are incorporated in the polycondensation network, it is preferred that said polycondensation network contains moieties derived from 0.1 to 100% by weight of polyfunctional organosilane, 0 to 20% by weight of organosilane (I) which contains a hetero atom, 0 to 99.9% by weight of alkoxide (II) and 0 to 70% by weight of nano-particles. In a more preferred embodiment, said polycondensation network contains 20 to 80% by weight of polyfunctional organosilane, 20 to 80% by weight of alkoxide (II), 0 to 10% by weight of organosilane (I) which contains a hetero atom, and 0 to 50% by weight of nanoparticles.

The Non Silicon Containing Polymeric Compound

The non silicon containing polymeric compound preferably has a number average molecular weight larger than 1000, more preferably larger than 2000. It can be an addition homopolymer, e.g., polystyrene, polymethylacrylate, polymethylmethacrylate, polymethylacrylicacid, polymethylmethacrylacid, and the like. It can be a copolymer, e.g., styreneacrylic resin. It can also be a vinylpolymer such as polyvinylbutyral, polyvinylacetate, polyvinylalcohol, and the like. The vinyl polymers are preferred as non silicon containing polymer for use in the present invention. Also, polycondensation polymers, e.g., polyesters, polyamides, polyimides etc. can be used as well as polymers comprising fluor containing moieties.

The Organosilane Containing an Hetero-atom

The organosilane containing a hetero-atom for use in a carrier coating according to this invention consists of at least one silicon atom carrying a hydrolysable group and/or a group that can be cross-linked by polycondensation and at least one organic rest group, bound to the silicon atom by a carbon atom, wherein the rest group contains a hetero atom and can be an alkyl, cycloalkyl or aryl group. The silicon atom carrying a hydrolysable group and/or a group that can be cross-linked by polycondensation can be —SiOR, wherein R can be an alkyl, cycloalkyl or aryl group and is preferably an alkyl group or —SiOH. It is preferred that R is an alkyl group. The hetero atoms can be N, P, S, F, Cl, Br, O, B and Al, but are more preferably N or F.

Particularly preferred nitrogen containing organosilanes for use in a coating according to this invention have the formula (I):

$$(R_2)_2\text{—N}[(CH2)_mNR_2]_n(CH_2)_mSi(OR_3)_{3-o}(R_4)_o \quad (I)$$

wherein $1 \leqq m \leqq 10$, preferably m=2 or 3, $0 \leqq n \leqq 2$ preferably n=2, $0 \leqq o \leqq 2$, preferably o=0, $R_2$ is hydrogen, alkyl or aryl, preferably hydrogen, R3, R4 that are equal or different are alkyl or aryl groups, preferably CH3 or C2H5.

Typical useful nitrogen containing alkoxysilanes are:

$H_2N$—$(CH_2)_3Si(OCH_3)_3$ $H_2N$—$(CH_2)_3Si(OC_2H_5)_3$ $H_2N$—$(CH_2)_2$—HN—$(CH_2)_3Si(OCH_3)_3$ $H_2N$—$(CH_2)_2$—HN—$(CH_2)_3Si(OCH_3)_2CH_3$

C6H5—HN—$(CH_2)_3Si(OCH_3)_3$

C6H5—HN—$(CH_2)_3Si(OC_2H_5)_3$ $H_2N$—$(CH_2)_2$—HN—$(CH_2)_2$—HN—$(CH_2)_3Si(OCH_3)_3$ $H_2N$—$(CH_2)_2$—HN—$(CH_2)_2$—HN—$(CH_2)_3Si(OC_2H_5)_3$

Typical useful nitrogen containing alkoxysilanes are:

$F_3C$—$(CH_2)_2SiR'_{3-x}(OR)_x$ $F_3C$—$(CF_2)_7$—$(CH_2)_2SiR'_{3-x}(OR)_x$ $(F_3C)_2CF$—O—$(CH_2)_3SiR'_{3-x}(OR)_x$ (3—$F_3C$—$C_6H_4$)—$SiR'_{3-x}(OR)_x$ (3—$F_3C$—$C_6H_4)_2$—$Si(OR)_2$ wherein $1 \leqq x \leqq 3$, R, R' equal or different are alkyl, cycloalkyl or aryl, preferably R and R' are either methyl or ethyl.

The Alkoxide

The alkoxide for use in a coating according to this invention corresponds preferably to formula (II):

$$M_1(OR_1)_y \quad (II)$$

Wherein $M_1$=Si, Sn, Ti, Zr, B, P or Al $R_1$=alkyl or aryl, preferably a C1 to C4 alkyl, more preferably $CH_3$ or $C_2H_5$.

y=4 when $M_1$=Si, Sn, Ti, Zr, y=3 when $M_1$=B, P or Al. Preferred alkoxides are: $Si(OC_2H_5)_4$, $B(OC_2H_5)_3$, Al(O—i—$C_3H_7)_3$ and Zr(O—i—$C_3H_7)_4$. It is highly preferred to use $Si(OC_2H_5)_4$ as alkoxide in a polycondensation network on the carrier particles of this invention.

The Polyfunctional Organosilane

Polyfunctional organosilanes for use in the present invention comprise at least 2, preferably 3 Si-atoms coupled to 1 to 3 hydrolysable groups and/or a group that can be cross-linked by polycondensation. The latter groups are preferably alkoxy-, acyloxy or hydroxygroups. The Si-atoms are preferably coupled by a Si—C bond to an organic group, e.g., to a linear or branched C1 to C10 alkylgroup, to a C5 to C10 cycloalkylgroup, to an aromatic group or combinations of these.

Polyfunctional organosilanes useful to prepare a coating according to this invention correspond to formula (III), (IV) and (V)

$$(R_5)_{4-i}Si[(CH_2)_pSi(OR_6)_a(R_7)_{3-a}]_i \quad \text{(III)}$$

wherein

- i is an integer with value between 2 and 4, preferably i=2
- p is an integer with value between 1 and 4, preferably $2 \leqq p \leqq 4$
- a is an integer with value between 1 and 3
- $R_5$ is an alkyl or aryl group
- $R_6$ hydrogen, alkyl or aryl when a=1
- $R_6$ alkyl or aryl when a=2 or a=3
- $R_7$ alkyl or aryl, preferably methyl.

(IV)

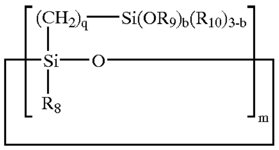

wherein

- m is an integer with value between 3 and 6, preferably m=3
- q is an integer with value between 2 and 10, preferably q=2
- b is an integer with value between 1 and 3
- $R_8$ is a C1–C6 alkyl or C6–C14 aryl group, preferably $CH_3$, $C_2H_5$
- $R_9$ hydrogen, alkyl or aryl, preferably H, $CH_3$, $C_2H_5$, $C_3H_7$ when c=1
- $R_9$ alkyl or aryl, $CH_3$, $C_2H_5$, $C_3H_7$ when c=2 or c=3
- $R_{10}$ alkyl or aryl, preferably methyl.

$$(R_{14})_{4-k}Si[OSi(R_{11})_2Si(OR_{12})_c(R_{13})_{3-c}]_k \quad \text{(V)}$$

wherein

- k is an integer with value between 2 and 4, preferably i=4
- r is an integer with value between 1 and 10, preferably $2 \leqq p \leqq 4$
- c is an integer with value between 1 and 3
- $R_{14}$ is an alkyl or aryl group
- $R_{12}$ hydrogen, alkyl or aryl, preferably H, $CH_3$, $C_2H_5$, $C_3H_7$ when c=1
- $R_{12}$ alkyl or aryl, $CH_3$, $C_2H_5$, $C_3H_7$ when c=2 or c=3
- $R_{11}$ alkyl or aryl, preferably methyl.

Typical examples of polyfunctional organosilanes useful in this invention are:

$Si[(CH_2)_2Si(OH)(CH_3)_2]_4$ $H_3CSi[(CH_2)_2Si(OH)(CH_3)_2]_3$ $H_6C_5Si[(CH_2)_2Si(OH)(CH_3)_2]_3$ $Si[(CH_2)_3Si(OH)(CH_3)_2]_4$ cyclo-$\{OSiCH_3[(CH_2)_2Si(OH)(CH_3)_2]\}_4$ cyclo-$\{OSiCH_3[(CH_2)_2Si(OCH_3)(CH_3)_2]\}_4$ cyclo-$\{OSiCH_3[(CH_2)_2Si(OCH_3)_2CH_3]\}_4$ cyclo-$\{OSiCH_3[(CH_2)_2Si(OC_2H_5)_2CH_3]\}_4$ cyclo-$\{OSiCH_3[(CH_2)_2Si(OC_2H_5)_3]\}_4$ The Coating Solution It is preferred to prepare a coating solution with the chemical compounds described above by adding an amount between 0.1 to 50% by weight of a polyfunctional organosilane and 0 to 50% of an alkoxide optionally together with a catalyser, which can be an organic acid, e.g. formic acid, acetic acid, paratoluenesulphonic acid, etc. in a solvent (preferably a lower C1 to C4 alcohol, most preferred isopropanol). After a pre-reaction, 0 to 20% by weight of an organosilane containing a hetero-atom is added and the solution is further diluted with solvent. The amounts above are given in % by weight with respect to the total amount of chemicals used to form the polycondensation network. Then 2.5 to 25% by weight, with respect to all chemicals used in the coating solution, of a polymeric compound not containing silicon atoms is added. In a further preferred embodiment said coating solution comprises 5 to 15 of a polymeric compound not containing silicon atoms.

In a further preferred embodiment said coating solution comprises between 30 and 50% by weight of a polyfunctional organosilane reacted with between 30 and 50% by weight of alkylorthosilicate (preferably tetraethylorthosilicate=TEOS=(Si(OC2H5)4), between 0 and 5% of an organo silane comprising an hetero atom and between 5 and 15% by weight of a polymeric compound not containing silicon atoms.

The relative amounts of the constituents of the coating are adapted so has to have a total of 100%.

When this solution is coated on the particles and dried, the polyfunctional organosilane, the alkoxide and the organosilane containing a hetero-atom have reacted together and have lost water and alcohol so that in the dried coating only 50% by weight of the sum of the amounts (weight) of the polyfunctional organosilane, the alkoxide and the organosilane added to the coating solution is contained in the coating. The non silicon atom containing polymer does not lose weight during the coating and thus when 2.5% by weight of the non silicon atom containing polymer is added to the coating solution, 5% by weight is present in the dried coating.

The present invention thus encompasses a method for coating carrier particles with a polycondensation network incorporating a polymer not containing Si-atoms, comprising the steps of:

- mixing an amount between 0.1 to 50% by weight, with respect to the total amount of chemicals used for forming said polycondensation network, of a polyfunctional organosilane and 0 to 50%, with respect to the total amount of chemicals used for forming said polycondensation network, of an alkoxide, optionally together with a catalyser in a lower C1 to C4 alcohol forming a coating solution,
- adding 0 to 20% by weight, with respect to the total amount of chemicals used for forming said polycondensation network, of a organosilane containing a hetero-atom to said solution,
- diluting said solution further with said lower C1 to C4 alcohol,
- mixing between 2.5 to 25% by weight, with respect to the total amount of chemicals used in said coating solution, of a polymeric compound not containing silicon atoms in said solution,
- applying said solution to said carrier particles forming a layer of said solution on said particles, and
- drying said particles.

Preferably in said step of mixing a polyfunctional organosilane and an alkoxide, between 30 and 50% by weight, with respect to the total amount of chemicals used for forming said polycondensation network, of said polyfunctional organosilane is mixed with between 30 and 50% by weight, with respect to the total amount of chemicals used for forming said polycondensation network, of an alkylorthosilicate, and in said step of adding an organosilane containing a hetero-atom, 0 and 5% by weight, with respect to the total amount of chemicals used for forming said polycondensation network, of an organo silane comprising an hetero atom is added.

In a further preferred embodiment, in said step of mixing a polyfunctional organosilane and an alkylorthosilicate, said alkylorthosilicate is tetraethylorthosilicate (TEOS) and in said step of mixing a polymeric compound not containing silicon atoms in said solution, between and 15% by weight, with respect to the total amount of chemical in said coating solution, of said polymeric compound not containing silicon atoms is used.

The coating solution according to this invention and described immediately above can preferably be applied to the carrier particles by the method dissclosed in EP-A 898 206 and its equivalent U.S. Pat. No. 5,888,692, that is incorporated herein by reference.

The present invention encompasses thus also a method for coating carrier particles, having a volume average diameter between 20 and 200 dun, for use in electrostatic developers, comprising the steps of:

- bringing said carrier particles to be coated in a vessel equipped with means for agitating said carrier particles, so that said carrier particles occupy less than 85% by volume of said vessel, and the agitation of the carrier particles is described by a Froude number between 0.2 and 20,
- adding a solution containing between 6 and 60% by weight with respect to the total volume of said solution of chemical compounds for coating said carrier particles in a solvent with a boiling point of A° C. to said vessel at such a rate that, at any time, said solvent is present in an amount lower than 1.25 10-4 ml per cm2 of surface of said carrier particles to be coated,
- keeping said carrier particles in said vessel at a temperature of at most (A+10)° C., and
- continuously evacuating said solvent, characterised in that said solution of chemical compounds contains of a polymeric compound not containing silicon atoms and a chemical compound selected from the group consisting of a monomeric polyfunctional organosilane, a hydrolysis product of a monomeric polyfunctional organosilane, a reaction product of a monomeric polyfunctional organosilane with an organosilane containing a hetero-atom and a reaction product of a monomeric polyfunctional organosilane with an alkoxide, said polymeric compound not containing silicon atoms is present in said solution at between 5 and 50% by weight with respect to the total weight of chemical compounds in said solution.

Preferably said Froude number is between 0.5 and 8 both limits included. Said solution with chemical compounds for coating the carrier particles contains preferably between 15 and 40% by weight with respect to the total volume of said solution of chemical compounds for coating said particles. Said solution is preferably added to said vessel at a rate that, at any time, said solvent is present in an amount lower than 0.6 $10^{-4}$ ml per $cm^2$ of surface of said particles to be coated. In a preferred embodiment of this invention, said vessel with a mechanical mixer wherein the carrier particles are coated is a ploughshare mixer. Carrier particles coated with a coating composition according to this invention, can be used in any multi-component developer comprising magnetic carrier particles and toner particles, it can be used in electrophotography, direct electrostatic printing, ionography etc.

EXAMPLES

1. Toner Particles

The toner used for the experiment had the following composition: 97 parts of a co-polyester resin of fumaric acid and propoxylated bisphenol A, having an acid value of 18 and volume resistivity of $5.1\times10^{16}$ Ω·cm was melt-blended for 30 minutes at 110° C. in a laboratory kneader with 3 parts of Cu-phthalocyanine pigment (Colour Index PB 15:3). A resistivity decreasing substance—having the following structural formula: $(CH_3)_3N^+C_{16}H_{33}Br^-$—was added in a quantity of 0.5% with respect to the binder.

After cooling, the solidified mass was pulverised and milled using an ALPINE Fliessbettgegenstrahlmühle type 100AFG™ and further classified using an ALPINE multiplex zig-zag classifier type 100MZR™. The resulting particle size distribution of the separated toner, measured by Coulter Counter model Multisizer™, was found to be 6.3 μm average by number and 8.2 μm average by volume. In order to improve the flowability of the toner mass, the toner particles were mixed with 0.5% of hydrophobic colloidal silica particles (BET-value 130 $m^2$/g). An electrostatographic developer was prepared by mixing said mixture of toner particles and colloidal silica in a 4% ratio (wt/wt) with carrier particles coated according to the examples.

2. Coating of the Carrier Particles 7.5 kg of ferrite beads, having an average volume diameter dv of 50 um was placed in a vessel equipped with a stirrer. A coating solution was prepared and was added over 25 minutes at 80° C. The mixtures were post-cured for 120 minutes at 140° C. Then, the amount of agglomerates was determined by sieving over a 125 μm sieve and expressed as % wt/wt. The charging characteristics were measured upon admixture of 5% of toner. The Q/M-value was determined at different activation times, by a blow-off method. The difference of the Q/M-values was taken as an indication of the activation property of the coated carrier particles.

Comparative Example 1

A coating solution was prepared containing 39.7 g of cyclo-{OSiCH3[(CH2)2Si(OC2H5)2CH3]}4 and 37 g of TEOS (Si(OC2H5)4), in 15 g of isopropanol and 6.6 g of a 0.1 N solution of paratoluenesulphonic acid as a catalyst. After one hour at room temperature, 0.39 g of H2N—(CH2) 2—HN—(CH2)2—HN—(CH2)3Si($OCH_3$)3 was added together with 150 g of isopropanol. This resulted, after reaction and coating, in 38.5 grams of a polycondensation network. This solution was added to the ferrite beads according to the general coating procedure described above so as to have a dry coating of 0.5% by weight with respect to the weight of the ferrite beads. In this comparative example, wherein no non silicon containing polymeric compound was added, the amount of agglomerates was 2% and the Q/m (charge over mass ratio) as a function of rubbing time is given in the table below:

| Rubbing time | Q/m |
|---|---|
| 2 min | 13.3 |
| 10 min | 14.1 |
| 30 min | 16.0 |
| 60 min | 18.4 |

It is seen that the Q/m ratio is not a constant increase over the time, thus showing a lower speed of charging.

Comparative Example 2

In this example the ferrite beads were coated according the general procedure above with a solution containing only non silicon containing polymeric compound. In this case, BUTVAR B79 (trade name of polyvinyl butyral from Monsanto), weight average molecular weight MW=34000–38000 was used. The coating solution consisted of 15% BUTVAR in a mixture 1/3 MEK-2/3 isopropanol. The amount of coated material was 0.5% relative to the ferrite carrier core.

Invention Example 1

Comparative example 1 was repeated, except for the fact that 5% by weight of BUTVAR B79 (trade name of polyvinyl butyral from Monsanto), weight average molecular weight MW=34000–38000 was added to the coating solution before coating, resulting in a coating containing 10% by weight of BUTVAR and 90% by weight of the polycondensation network.

In this invention example, wherein a non silicon containing polymeric compound was added, the amount of agglomerates was 6% and the Q/m (charge over mass ratio) as a function of rubbing time is given in the table below:

| Rubbing time | Q/m |
|---|---|
| 2 min | 18.0 |
| 10 min | 16.9 |
| 30 min | 17.9 |
| 60 min | 19.0 |

It is seen that the maximum Q/m ratio was almost reached after 2 minutes and remained fairly constant. Thus these carrier particles showed a high speed of charging.

Invention Example 2

Invention example 1 was repeated but a dispersion of carbon black (KETJEN BLACK EC) was added so that the final coating contained 20% by weight of Carbon Black, 20% by weight of BUTVAR $B_{79}$ and 60% by weight of the polycondensation network.

In this invention example, wherein a non silicon containing polymeric compound and a charge regulating agent were added, the amount of agglomerates was 3% and the Q/m (charge over mass ratio) as a function of rubbing time is given in the table below:

| Rubbing time | Q/m |
|---|---|
| 2 min | 15.2 |
| 10 min | 15.0 |
| 30 min | 14.4 |
| 60 min | 15.7 |

It is seen that the maximum Q/m ratio was almost reached after 2 minutes and remained fairly constant. Thus these carrier particles showed a high speed of charging.

What is claimed is:

1. Carrier particles having a coating comprising a monomeric, polyfunctional organosilane containing at least two silicon atoms, each silicon atom having one to three hydrolysable groups or condensation crosslinking groups, wherein said silicon atoms are each bonded by a Si—C bond to a structural unit which links at least one of said silicon atoms, a hydrolysis product of said monomeric, polyfunctional organosilane, or a reaction product of said monomeric, polyfunctional organosilane with an organosilane containing at least one of a hetero atom and an alkoxide, wherein said coating further comprises a weight percent, A, of a polymeric compound not containing silicon atoms relative to the weight of the dried coating such that $5\% \leqq A \leqq 50\%$.

2. Carrier particles according to claim 1, wherein $10\% \leqq A \leqq 30\%$ by weight.

3. Carrier particles according to claim 2, wherein said polymer compound not containing silicon atoms is a member selected from the group consisting of acrylic resins, vinyl resins, fluor containing addition polymers, polyesters, polyimides and polyamides.

4. Carrier particles according to claim 2, wherein said polymer compound not containing silicon atoms is a member selected from the group consisting of polyvinylbutyral, polyvinylacetate and polyvinylalcohol.

5. Carrier particles according to claim 1, wherein said polymer compound not containing silicon atoms is a member selected from the group consisting of acrylic resins, vinyl resins, fluor containing addition polymers, polyesters, polyimides and polyamides.

6. Carrier particles according to claim 1, wherein said polymer compound not containing silicon atoms is a member selected from the group consisting of polyvinylbutyral, polyvinylacetate and polyvinylalcohol.

* * * * *